March 23, 1948.   R. A. SMITH   2,438,192
BEARING
Filed June 17, 1943
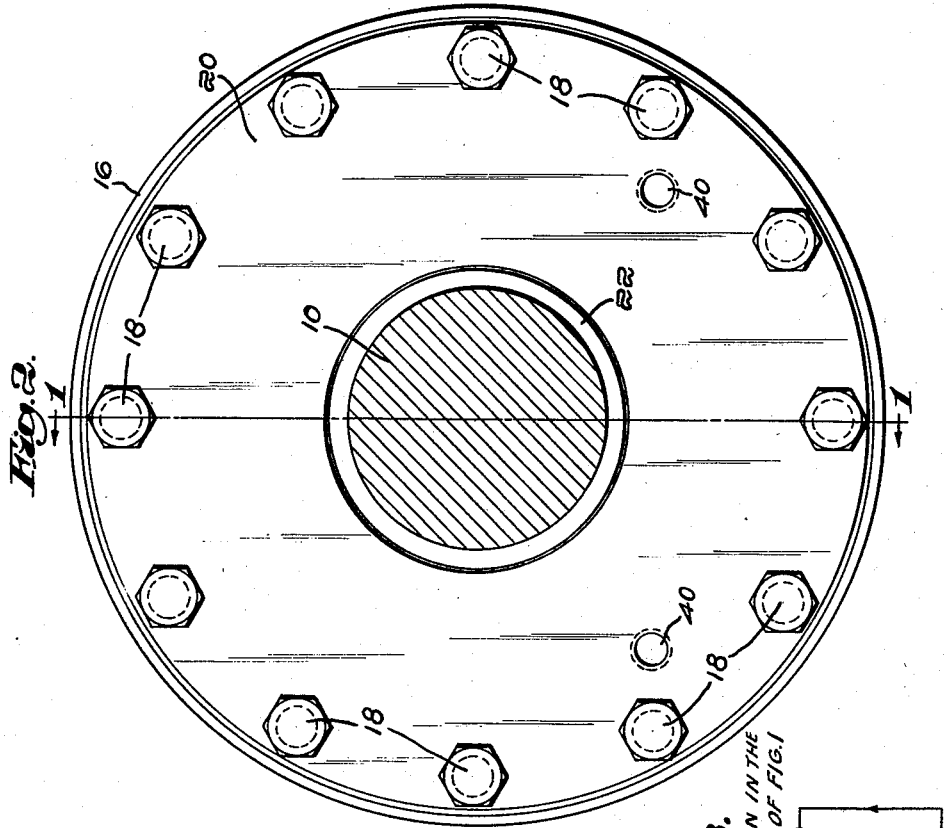
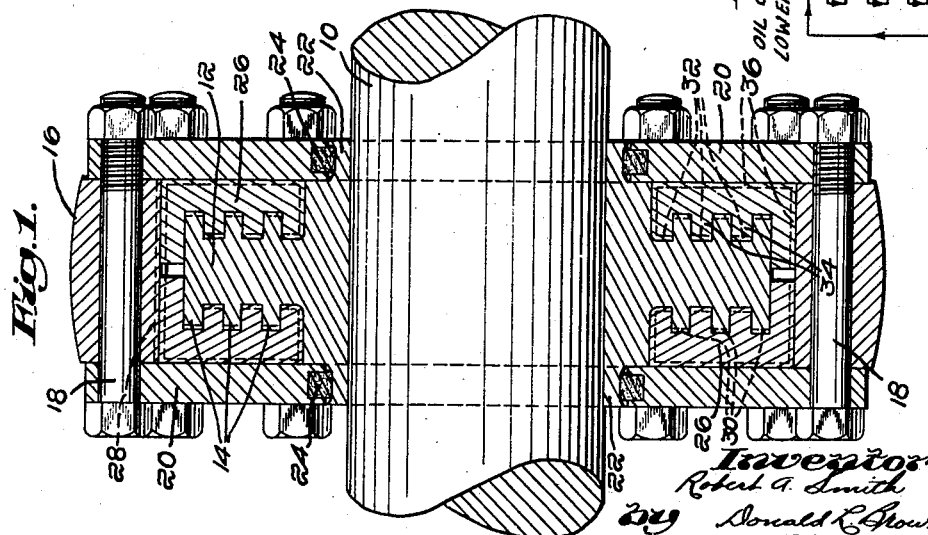

Patented Mar. 23, 1948

2,438,192

UNITED STATES PATENT OFFICE 2,438,192

BEARING

Robert A. Smith, Mahwah, N. J.; Mary Gray Smith, Margaret Smith Pryde, and Mary Smith van Brederode, executrices of said Robert A. Smith, deceased, assignors to Smith & Serrell, Inc., Newark, N. J., a corporation of New Jersey Application June 17, 1943, Serial No. 491,098

12 Claims. (Cl. 308—78)

This invention relates to a new and improved bearing.

The invention provides a multiple surface bearing of short axial length which is adapted to carry considerable bearing weight.

The invention further provides means for lubricating a bearing of the character described so that it may operate at high speeds, and more particularly it provides, in connection with a bearing of the character described, means to insure oil circulation between the operative surface elements, the said circulation being accomplished essentially by the centrifugal action caused by rotation of the shaft and elements keyed or otherwise affixed thereto.

The invention, moreover, provides a bearing of the character described which is durable, which may be readily assembled and adjusted, which is adapted to limit end play, and in which the worn parts may be readily replaced.

The invention accordingly comprises an article of manufacture comprising the features of construction, combination of elements and arrangement of parts which are exemplified in the following detailed description, and the scope of the application of which will be indicated in the claims.

For a fuller understanding of the invention, reference should be had to the following description, taken in connection with the accompanying drawings, wherein:

Figure 1 is a view partially in section and partially in plan of a bearing embodying a preferred form of the invention, taken along the line 1—1 of Fig. 2;

Fig. 2 is a view in end elevation of the device shown in Fig. 1; and

Fig. 3 is a diagrammatic representation of the oil circulation between the working faces of the bearing shown in Figs. 1 and 2.

In the embodiment of the invention shown in the drawings, 10 represents a shaft on which there is affixed a multiple surface collar bearing 12. This bearing is preferably formed in one piece. It may be affixed to the shaft in any desired manner, as, for example, by being pressed onto the shaft, or it may be clamped to the shaft or keyed thereto, or tapered onto the shaft or otherwise affixed thereto. The bearing is provided with a multiplicity of weight-supporting annular rings 14, formed integrally with the bearing. In the embodiment of the invention shown in the drawing, three such annular rings are provided. It is to be understood that the number may be altered and that the drawing is illustrative only of one of several types of similar bearings embodying the invention. The multiple surface collar bearing may preferably be formed of steel or other suitable hard, durable material.

The stationary elements of the device may comprise any suitable enclosing and mounting means and a cooperating bearing lining. In the embodiment of the invention shown, the enclosing means comprise a casing ring 16, which may be formed in one piece of, for example, cast iron and which may be provided with any suitable means for mounting it to a supporting element (not shown). In the embodiment of the invention shown, the casing ring is crowned for self-alignment in a bearing mount (not shown). It will be apparent to those skilled in the art that many other ways of affixing the casing ring to a support may be employed.

Affixed to the casing ring, as for example by the bolts 18, are two end covers 20 which, as shown in Fig. 1, are preferably each formed in a single piece, for example of cast iron. The multiple surface bearing 12 may be provided at its base with extensions 22, underlying the end covers 20, and a seal may be provided between the end covers and the collar bearing by dust rings 24, for example. These rings may be positioned in suitable channels formed in the inner edges of the end covers and may be held in place by a slightly increased lip diameter of the collar bearing. The dust rings may be made of felt or other suitable material.

Within the end covers and in operative contact with the annular rings of the multiple surface bearing, there are provided suitable stationary bearing linings 26. These linings, as shown in the drawing, are two-piece linings, each split horizontally for easy removal from the casing. They are preferably made of bronze or some similar material and may be keyed to the end covers and/or enclosing casing ring, as for example by the pin 28, in order to prevent rotation of the linings within the casing. The keying means should preferably be so arranged as to permit endwise removal of the lining pieces for replacement and this may be accomplished by providing a suitable groove for the retention of the pin 28.

Means are provided to insure proper lubrication of the bearing and working surface of the device. This may be accomplished in the following manner:

The axial edges of the annular rings of the multiple surface collar bearing 12 may be provided with radially extending oil grooves 30, and similar radially extending oil pumping grooves 32 may be provided in the innermost surfaces of the cooperating annular rings 34 of the bearing lining elements 26. Additional oil passages 36 may be provided in the outer surfaces of the bearing lining elements to insure ready circulation of the lubricant as hereinafter described.

There will be a slight play or clearance between the collar bearing 12 and the bearing lining elements 26. In the upper half of the bearing, the bearing surface will be the under surfaces of the annular rings 14 of the collar bearing 12 and the upper surfaces of the annular rings 34 of the bearing elements 26 so that there will be a slight gap between the under surfaces of the rings of the lining elements and the upper surfaces of the rings of the bearing. In the lower half of the device this condition will be reversed and the bearing surfaces are the lower surfaces of the annular rings of the collar bearing and the upper surfaces of the annular rings of the bearing lining elements, and gaps will exist between the upper surfaces of the rings of the bearings and the lower surfaces of the rings of the lining elements. It is to be understood that the work-supporting surfaces include also the other surfaces of the collar bearing which are parallel to the surface of the shaft on which it is mounted, and the cooperating surfaces of the lining elements.

Rotation of the shaft 10 and the collar bearing affixed thereto acts as a centrifugal pump, with a structure as has just been described, to force oil outwardly between the work-supporting surfaces of the bearing and the bearing lining elements. The oil returns through the passages 36 to the portion of the collar bearing adjacent the shaft. This oil circulation is illustrated diagrammatically in Fig. 3, which is to be understood as representing the circulation of oil in the lower portion of the structure shown in Fig. 1.

A reservoir for the oil lubricant (not shown) is of course provided. Connections between the reservoir and the bearing may be provided, for example as at 40 in Fig. 2. Preferably the oil reservoir is so designed as to have a large surface area at the oil level maintained within the bearing casing.

With a construction such as has been described, worn linings may be readily replaced by unbolting an end cover 20, moving it slightly along shaft 10, similarly displacing the casing ring 16 to expose the worn lining, and then removing the lining element by sliding it along the shaft until it has disengaged the collar bearing and then removing it radially.

It will be apparent that the bearing construction shown limits end play of the shaft. If end play is desired, the width of the enclosing ring may be increased without changing the sizes of the multiple-surface collar bearing or the lining elements. The lining elements may then be held against the bearing by providing springs or similar means between the linings and the end covers. These and other variations in the construction of the bearing, particularly in connection with the method of sealing the end covers and the hub, for example, may be made without departing from the scope hereof. It will be apparent that bearings of different size will require different clearances. These clearances may be readily determined by operation if not already apparent to those skilled in the art.

The bearing such as has been described provides means for carrying a considerable bearing load with a short axial length of bearing. It is, moreover, adequately lubricated and may be operated at high speeds. It is relatively simple of construction and may be quickly and easily assembled. It operates efficiently, its worn parts may be promptly and easily replaced, and it is readily adapted to a wide variety of uses.

It will be apparent that the structure of the present invention functions not only as a multiple-surface, weight-supporting bearing of short axial length, but that it acts also in the nature of a thrust bearing by limiting end play, as previously pointed out.

Wherever reference is made in the specification or claims to "contact" between the juxtaposed surfaces of the collar bearing and bearing linings, it is to be understood that in operation with lubrication such surfaces are separated by an oil wedge or film.

What is claimed is:

1. In a device of the character described, a collar bearing mounted on a shaft for rotation therewith, a plurality of substantially concentric, spaced, annular, weight-supporting rings rigidly affixed to said collar bearing, said rings providing a plurality of pairs of axially spaced annular bearing surfaces, a plurality of bearing lining elements comprising annular, weight-supporting rings cooperating with the rings of said collar bearing and radially positioned therebetween, said lining rings providing a plurality of pairs of axially spaced bearing surfaces in operative engagement with the annular bearing surfaces of said first-named rings, means providing an enclosure, means to fixedly position said lining elements within said enclosure, and means for insuring lubrication of the surfaces in contact of said collar bearing and said lining elements.

2. A multiple surface bearing of short axial length comprising an element mounted for rotation with a shaft and comprising a plurality of radially spaced, weight-supporting rings, said rings providing a plurality of pairs of axially spaced annular bearing surfaces, lining elements comprising weight-supporting rings cooperating with the rings of said first-mentioned element, said lining rings providing a plurality of pairs of axially spaced annular bearing surfaces in operative engagement with the annular bearing surfaces of said first-named rings, a casing, means for mounting said lining elements fixedly with respect to said casing, and means for lubricating the contacting surfaces between said first-mentioned, rotatable element and said lining elements, a plurality of said rings having both the internal and external annular surfaces thereof adapted to serve as bearing surfaces during operation of said bearing.

3. In a device of the character described, a collar bearing mounted on a shaft for rotation therewith, a plurality of substantially concentric, spaced, annular, weight-supporting rings rigidly affixed to said collar bearing, said rings providing a plurality of pairs of axially spaced annular bearing surfaces, a plurality of bearing lining elements comprising annular, weight-supporting rings cooperating with the rings of said collar bearing and radially positioned therebetween, said lining rings providing a plurality of pairs of axially spaced bearing surfaces in operative engagement with the annular bearing surfaces of said first-named rings, means providing an enclosure, means to fixedly position said lining elements within said enclosure, and means comprising radially extending grooves in the outer surfaces of the rings of said collar bearing for insuring lubrication of the surfaces in contact of said collar bearing and said lining elements.

4. A multiple surface bearing of short axial length comprising an element mounted for rotation with a shaft and comprising a plurality of radially spaced weight-supporting rings, said rings providing a plurality of pairs of axially spaced annular bearing surfaces, lining elements comprising weight-supporting rings cooperating with the rings of said first-mentioned element, said lining rings providing a plurality of pairs of axially spaced annular bearing surfaces in operative engagement with the annular bearing surfaces of said first-named rings, a casing, means for mounting said lining elements fixedly with respect to said casing, and means for lubricating the contacting surfaces between said first-mentioned, rotatable element and said lining elements, said lining elements being split into a plurality of parts and removable from said casing without displacement of said rotatably mounted element axially, a plurality of said rings having both the internal and external annular surfaces thereof adapted to serve as bearing surfaces during operation of said bearing and at least one of said bearing rings extending between bearing surfaces provided by a pair of adjacent lining rings.

5. In a multiple surface bearing, a rotatably mounted element, a plurality of fixedly positioned bearing lining elements, means comprising substantially cylindrical, weight-supporting extensions from all of said elements providing a multiplicity of surfaces of contact between said rotatably mounted element and said lining elements, and means for lubricating said surfaces, said last-named means comprising cooperating radial passages provided by grooves formed in said lining elements and in said extensions of said rotatable elements, said passages providing with the bearing surfaces of said extensions a continuous path for the circulation of said lubricant.

6. In a multiple surface bearing, a rotatably mounted element, a plurality of fixedly positioned bearing lining elements, means comprising weight-supporting extensions from all of said elements providing a multiplicity of surfaces of contact between said rotatably mounted element and said lining elements, said surfaces being substantially parallel to the axis of rotation of said rotatably mounted element, and means for lubricating said surfaces, said last-named means comprising cooperating radial passages provided by grooves formed in said lining elements and in said extensions of said rotatable elements, said passages providing with the bearing surfaces of said extensions a continuous path for the circulation of said lubricant.

7. A weight-supporting, multiple surface bearing of short axial length comprising a rotatably mounted collar bearing comprising radially spaced, weight-supporting elements, a plurality of bearing lining elements, each comprising radially spaced, weight-supporting elements, means for holding the weight-supporting elements of said linings in operative contact with the weight-supporting elements of said collar bearing, and means for lubricating the surfaces of contact between said collar bearing and said linings, said lubricating means comprising radial passages provided by grooves formed in said bearing and said lining elements, said passages providing with the bearing surfaces of said bearing and said linings a continuous path for the circulation of said lubricant.

8. A weight-supporting, multiple surface bearing of short axial length comprising a rotatably mounted collar bearing comprising radially spaced, weight-supporting elements, a plurality of bearing lining elements, each comprising radially spaced, weight-supporting elements, means for holding the weight-supporting elements of said linings in operative contact with the weight-supporting elements of said collar bearing, and means responsive to the centrifugal action of said rotatably mounted collar bearing for lubricating the surfaces of contact between said collar bearing and said linings, said lubricating means comprising radial passages provided by grooves formed in said bearing and said lining elements, said passages providing with the bearing surfaces of said bearing and said linings a continuous path for the circulation of said lubricant.

9. A weight-supporting, multiple surface bearing of short axial length, comprising a rotatably mounted collar bearing comprising radially spaced, weight-supporting elements, a plurality of bearing lining elements, each comprising radially spaced, weight-supporting elements, means comprising casing elements axially movable with respect to said collar bearing for holding the weight-supporting elements of said linings in operative contact with the weight-supporting elements of said collar bearing, and means for lubricating the surfaces of contact between said collar bearing and said linings, said lubricating means comprising radial passages provided by grooves formed in said bearing and said lining elements, said passages providing with the bearing surfaces of said bearing and said linings a continuous path for the circulation of said lubricant.

10. In a device of the character described, a collar bearing mounted on a shaft for rotation therewith and providing a plurality of pairs of axially spaced, annular, concentric bearing surfaces, a plurality of bearing lining elements providing a plurality of pairs of axially spaced annular bearing surfaces in operative contact with the bearing surfaces of said collar bearing, means providing an enclosure, and means to fixedly position said lining elements within said enclosure, said collar bearing cooperating with said lining elements to provide a passage for the flow of a lubricant from the internal to the external peripheral surfaces of said lining elements, said passage including the bearing surfaces, and said lining elements cooperating with said enclosure means to provide still another passage connecting with both ends of said first-named passage to provide for the flow of said lubricant from the external to the internal periphery of said lining elements whereby a continuous circulation of the lubricant may be maintained during operation of the device.

11. In a device of the character described, a collar bearing mounted on a shaft for rotation therewith and providing a plurality of pairs of axially spaced, annular, concentric bearing surfaces, a plurality of bearing lining elements providing a plurality of pairs of axially spaced annular bearing surfaces in operative contact with the bearing surfaces of said collar bearing, means providing an enclosure, and means to fixedly position said lining elements within said enclosure, said collar bearing, said lining elements and said enclosure means cooperating with one another to provide passages insuring continuous circulation of a lubricant past said bearing surfaces.

12. In a device of the character described, a collar bearing mounted on a shaft for rotation therewith and providing a plurality of pairs of axially spaced, annular, concentric bearing surfaces, a plurality of bearing lining elements providing a plurality of pairs of axially spaced annular bearing surfaces in operative contact with the bearing surfaces of said collar bearing, means providing an enclosure, means to fixedly position said lining elements within said enclosure, and means for insuring lubrication of said contacting bearing surfaces, said last-named means comprising cooperating passages in said bearing and said lining elements providing with said bearing surfaces a path for continuous circulation of said lubricant.

ROBERT A. SMITH.

REFERENCES CITED

The following references are of record in the file of this patent:

UNITED STATES PATENTS

| Number | Name | Date |
|---|---|---|
| 434,480 | Simonds | Aug. 19, 1890 |
| 990,946 | Badger | May 2, 1911 |
| 1,297,779 | Barmes | Mar. 18, 1919 |
| 1,835,127 | Willi | Dec. 8, 1931 |
| 1,859,989 | Schlegelmilch | May 24, 1932 |
| 2,022,252 | Miltenberger | Nov. 26, 1935 |
| 2,287,165 | Buckwalter | June 23, 1942 |

FOREIGN PATENTS

| Number | Country | Date |
|---|---|---|
| 553,068 | France | Feb. 3, 1923 |